US 6,685,384 B2

(12) United States Patent
Uchiyama

(10) Patent No.: US 6,685,384 B2
(45) Date of Patent: Feb. 3, 2004

(54) CABLE HARNESS ASSEMBLY FOR BICYCLE

(75) Inventor: Yuzuru Uchiyama, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/933,713

(22) Filed: Aug. 22, 2001

(65) Prior Publication Data

US 2001/0055515 A1 Dec. 27, 2001

Related U.S. Application Data

(62) Division of application No. 09/488,711, filed on Jan. 21, 2000.

(51) Int. Cl.$^7$ .............................. F16B 7/02; B62J 11/00
(52) U.S. Cl. .................... 403/367; 403/370; 248/74.1; 248/74.2
(58) Field of Search ................... 403/367, 370; 248/68.1, 69, 74.1, 74.2

(56) References Cited

U.S. PATENT DOCUMENTS

| 737,555 A | * | 8/1903 | Dorn ........................ 411/79 |
| 1,158,633 A | | 11/1915 | Carpenter et al. |
| 1,919,666 A | | 7/1933 | Patterson |
| 2,505,648 A | * | 4/1950 | Pawsat ........................ 403/301 |
| 3,361,455 A | * | 1/1968 | Hussey et al. .............. 403/191 |
| 4,274,301 A | * | 6/1981 | Katayama ............... 403/370 X |

(List continued on next page.)

FOREIGN PATENT DOCUMENTS

| CN | 361417 | 6/1999 |
| DE | 92 00 121.1 U1 | 6/1992 |
| DE | 92 10 298 U1 | 9/1992 |
| EP | 0 314 357 A2 | 5/1989 |
| EP | 0518203 A1 | 12/1992 |
| EP | 0 695 682 A1 | 2/1996 |
| FR | 1056501 A | 3/1954 |
| GB | 1052130 A | 9/1964 |

OTHER PUBLICATIONS

Shimano Catalog, "Shimano Bicycle System Components", Apr. 1982, p. 432.

Primary Examiner—Lynne H. Browne
Assistant Examiner—Ernesto Garcia
(74) Attorney, Agent, or Firm—Shinjyu Global IP Counselors, LLP.

(57) ABSTRACT

A cable harness assembly is provided on a bicycle for guiding a disk brake control hose in accompaniment of the cable stoppers brazed on a bicycle frame. The cable harness assembly basically has a hose hanger, a hanger stopper, a stopper bushing and a hanger fixing bolt. The hose hanger includes a body portion of a first outer diameter or width and formed with a first axial bore therethrough, and a cable portion extending from the body portion. The hanger stopper of a second outer diameter or width is smaller than the first outer diameter or width. The hanger stopper is formed with a halting piece extending from the hanger stopper and a second axial bore therethrough. The stopper bushing is sandwiched between the hose hanger and the hanger stopper and formed with a third axial bore therethrough. The stopper bushing is made of a radially expandable material and has a third outer diameter or width being normally approximate to the second outer diameter or width. The hanger fixing bolt is used for assembling the hose hanger, the hanger stopper, and the stopper bushing together by being fastened through the first axial bore of the hose hanger, the third axial bore of the stopper bushing, and the second axial bore of the hanger stopper. The third outer diameter or width of the stopper bushing increases when the fixing bolt is fastened to the second axial bore of the hanger stopper forcing the hose hanger and the hanger stopper to press against the stopper bushing. A further embodiment including a hose hanger and a stopper bushing is disclosed where the stopper bushing will rotate and skew with respect to the hose hanger while performing the fastening operation.

18 Claims, 7 Drawing Sheets

U.S. PATENT DOCUMENTS

| | | | |
|---|---|---|---|
| 4,574,963 A | | 3/1986 | Fullenkamp et al. |
| 4,657,299 A | | 4/1987 | Mahan |
| 4,716,674 A | | 1/1988 | Kammeraad |
| 4,733,835 A | | 3/1988 | Schlanger et al. |
| 4,785,889 A | | 11/1988 | Killion |
| 4,896,416 A | | 1/1990 | Cranko et al. |
| 4,939,950 A | * | 7/1990 | Girvin .................. 411/79 X |
| 5,186,074 A | * | 2/1993 | Arnold ................ 188/282.9 |
| 5,197,349 A | * | 3/1993 | Herman ................ 403/297 X |
| 5,241,881 A | * | 9/1993 | Chen .................... 74/551.2 |
| 5,411,232 A | * | 5/1995 | Hufford ............... 403/370 X |
| 5,509,328 A | * | 4/1996 | Lai .......................... 280/279 |
| 5,568,905 A | | 10/1996 | Smith, II |
| 5,688,089 A | | 11/1997 | Solle |
| 5,842,385 A | * | 12/1998 | Su ....................... 403/367 X |

* cited by examiner

US 6,685,384 B2

CABLE HARNESS ASSEMBLY FOR BICYCLE

CROSS-REFERENCE TO RELATED APPLICATION

This application is a divisional application of copending U.S. patent application Ser. No. 09/488,711, filed Jan. 21, 2000.

BACKGROUND OF THE INVENTION

1. Field of the Invention

This invention generally relates to a cable harness assembly for a bicycle. More specifically, the present invention relates to a cable harness assembly for guiding a disk brake control hose, a control cable or the like in accompaniment with a conventional cable stopper brazed on a bicycle frame.

2. Background Information

An arrangement of a generic cable harness is described in the ROC (Taiwan) Patent Publication No. 361417, such as that in FIG. 10. This type of cable harness A includes a cable gripper 33, a connector 30 and a connecting screw 31. The cable harness A is mounted to a bicycle by being mounted to a conventional cable stopper 11 brazed on the bicycle frame.

However, in such a type of cable harness A, the connector screw 31 must be detached from the connector 30 and then removed from the cable gripper 33 prior to being mounted to a cable stopper 11 of the bicycle frame. This arrangement is thus tedious to use and may easily result in losing small parts after dismantling.

The necessity arises of mounting a cable harness to the cable stopper without having to dismantle the cable harness in order to carry out mounting operations.

In view of the above, there exists a need for a cable harness assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a cable harness assembly that is easy to install.

More specifically, an object of the invention to design an arrangement for holding hoses, cables, or hydraulic lines in such a way that easy mounting is possible without the necessity to dismantle the cable harness assembly. As a result, losing of small parts can also be prevented and mounting can be easily accomplished without involving extraneous work.

To achieve the intended object, this invention discloses a cable harness assembly comprising a hose hanger, a hanger stopper, a stopper bushing and a hanger fixing bolt, wherein the stopper bushing expands when the fixing bolt is fastened to the hanger stopper forcing the hose hanger and the hanger stopper to press against the stopper bushing.

A further embodiment including a hose hanger and a stopper bushing is disclosed where the stopper bushing will rotate and skew with respect to the hose hanger while performing the fastening operation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
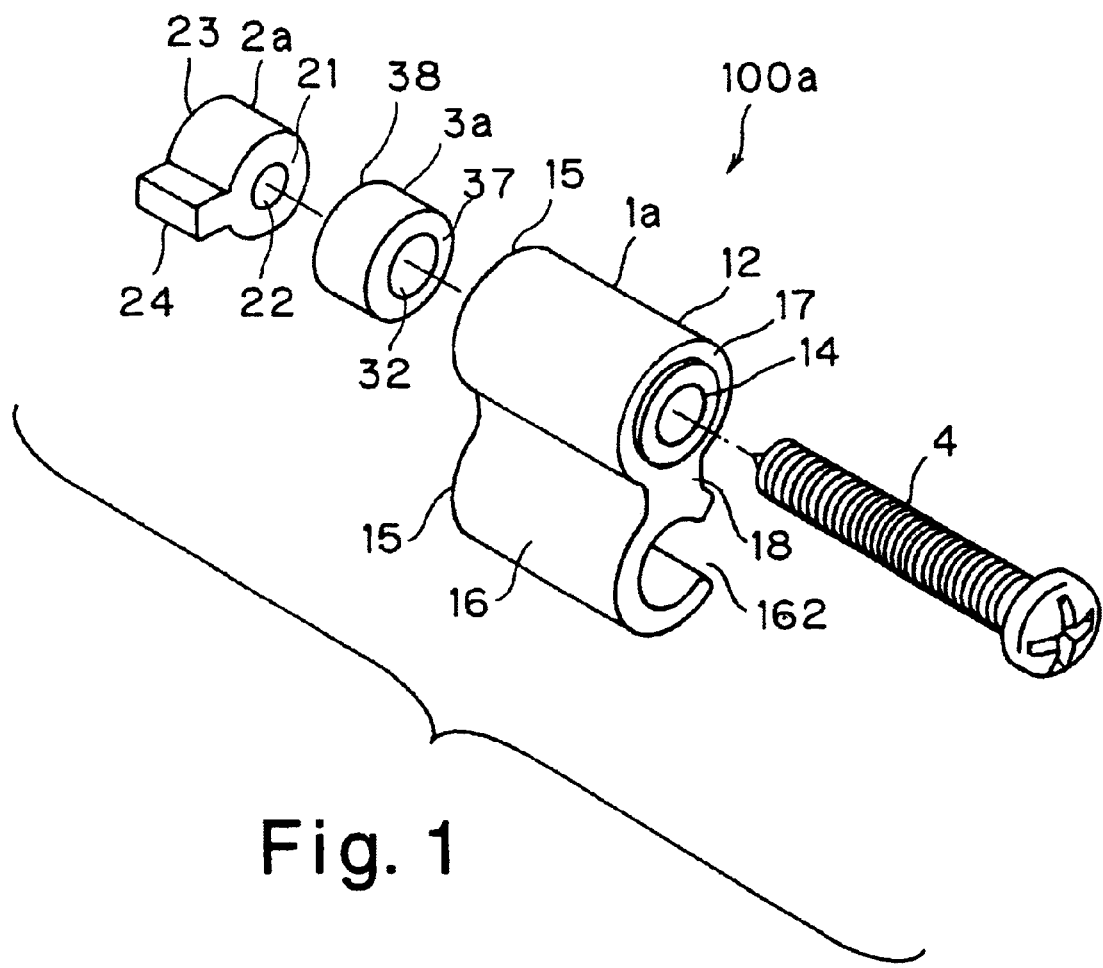
FIG. 1 is an exploded view illustrating the cable harness assembly in accordance with one embodiment of this invention.

As shown in FIG. 1, a cable harness assembly 100a is illustrated in accordance with one embodiment of the present invention. The cable harness assembly 100a basically comprises a hose hanger 1a, a hanger stopper 2a, a stopper bushing 3a and a hanger fixing bolt 4. The hose hanger 1a includes a body portion 12, a cable portion 16, and opposite ends 15 and 17. The body portion 12 has a first outer diameter or width that has a first axial bore 14 extending between opposite ends 15 and 17. The cable portion 16 extends outwardly from the body portion 12 for receiving a control cable or hose.

Figure 3:
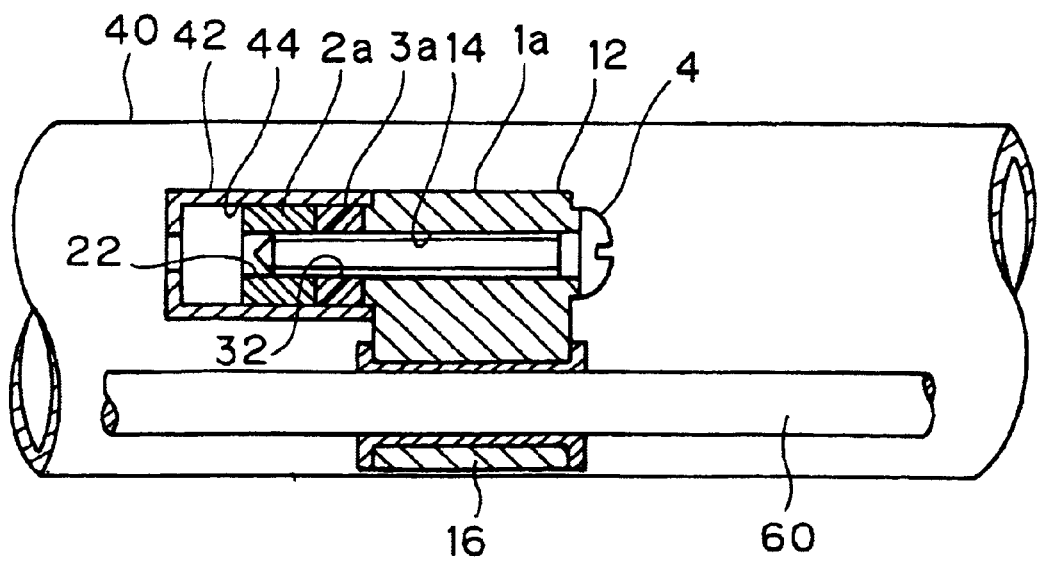
FIG. 3 is a cross-sectional view illustrating the cable harness assembly of FIG. 1 after being mounted to a cable stopper brazed on a bicycle frame.

To enhance the flexibility of the hose hanger 1a, the body portion 12 and the cable portion 16 of the hose hanger 1a can be joined by a neck portion 18. The hose hanger 1a is preferably integrally formed as a one-piece, unitary member by injection molding. The cable portion 16 of the hose hanger 1a is formed with a longitudinal opening or slot 162, preferably be configured to have a C-shaped cross-section. The C-shaped configuration of slot 162 has an inner diameter or width that is proximate to the outer diameter or width of a hose or hydraulic line 60, to be held in the cable portion 16 as seen in FIG. 3.

The hanger stopper 2a has opposite ends 21 and 23 and a second outer diameter or width, that is preferably slightly smaller than the first outer diameter or width of the body portion 12. The hanger stopper 2a is formed with a second axial bore 22 extending between opposite ends 21 and 23. A halting piece 24 further extends from the hanger stopper 2a, preferably in an outwardly radial direction. The halting piece 24 has a rectangular configuration. The function of the halting piece 24 will be described later.

The stopper bushing 3a has opposite ends 37 and 38. The stopper bushing 3a is sandwiched between the hose hanger 1a and the hanger stopper 2a, and formed with a third axial bore 32 therethrough. The stopper bushing 3a is made of a radially expandable material, that has a third outer diameter or width being normally approximate to the second outer diameter or width of the hanger stopper 2a. In the embodiment shown in FIGS. 1–3, the radially expandable material for making the stopper bushing 3a is a resilient material, such as rubber.

To assemble the hose hanger 1a, the hanger stopper 2a and the stopper bushing 3a together, the hanger fixing bolt 4 is inserted through the first axial bore 14 of the hose hanger 1a, the third axial bore 32 of the stopper bushing 3a and the second axial bore 22 of the hanger stopper 2a. Prior to mounting of the cable harness assembly 100a to a bicycle frame, a tip end of the hanger fixing bolt 4 is inserted and threaded into the second axial bore 22 of the hanger stopper 2a by a short distance sufficient to hold the hose hanger 1a, the stopper bushing 3a and the hanger stopper 2a together, but without providing external forces on the stopper bushing 3a, as shown in FIG. 2.

In use, the cable harness assembly 100a is inserted into a cable stopper 42 that is formed with an inner wall 44 and is conventionally brazed to a bicycle frame 40. The lateral end 15 of the hose hanger 1a next to the stopper bushing 3a then urges against a lateral end of the cable stopper 42. The halting piece 24 extending from the hanger stopper 2a is inserted through a slit (not shown) of the cable stopper 42 to halt the hanger stopper 2a from further rotation driven by the hanger fixing bolt 4. A tool (not shown) is then implemented to drive the hanger fixing bolt 4 such that the fixing bolt 4 is fastened to the second axial bore 22 of the hanger stopper 2a. The second axial bore 22 of the hanger stopper 2a may be formed with threads (not shown) therein so as to facilitate the fastening operation. The fixing bolt 4 may also be fastened to the second axial bore 22 in a self-tapping manner so as to reduce manufacturing cost of the hanger stopper 2a.

Figure 2:
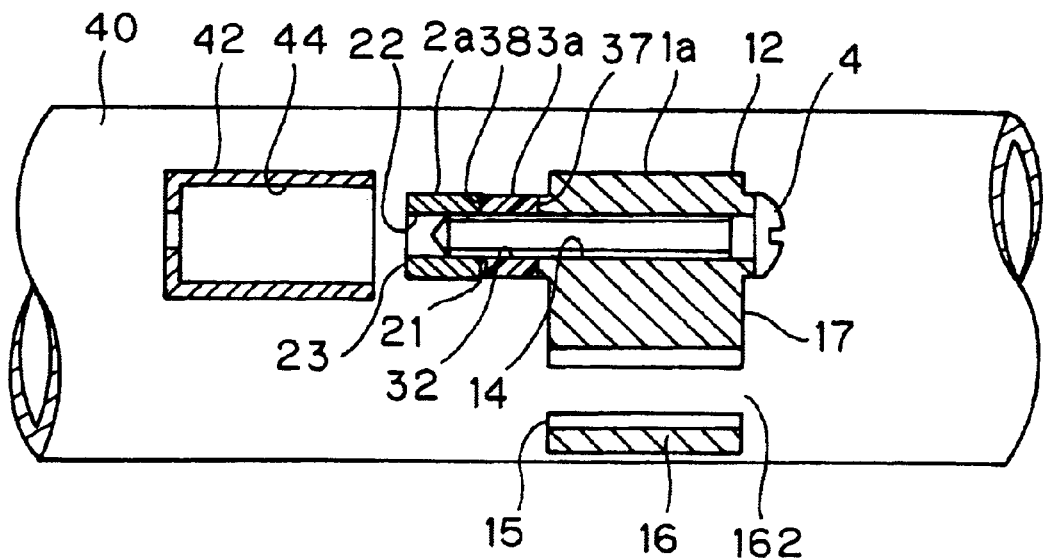
FIG. 2 is a cross-sectional view illustrating the cable harness assembly of FIG. 1 before being mounted to a cable stopper brazed on a bicycle frame.
Figure 9:
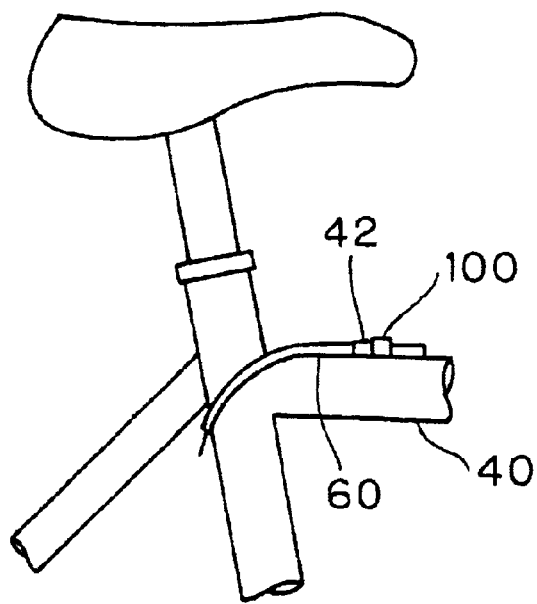
FIG. 9 illustrates a hose or a hydraulic line being guided through a cable harness assembly of this invention.
Figure 10:
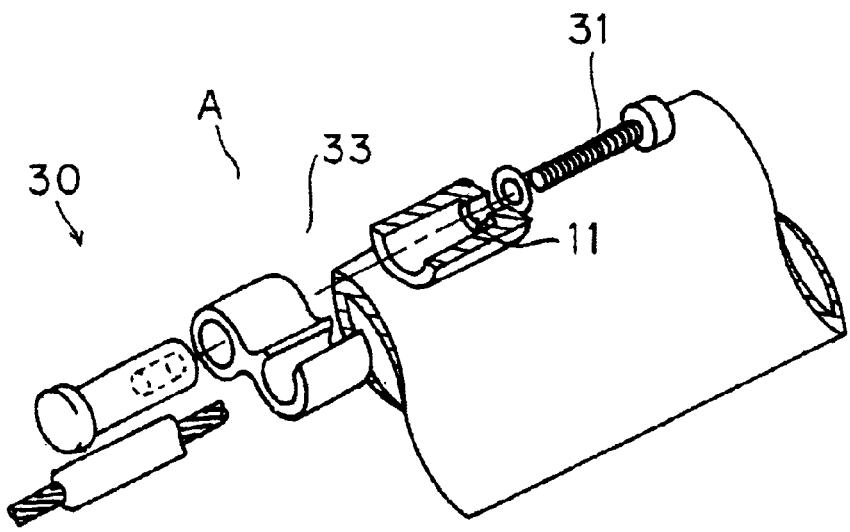
FIG. 10 illustrates a conventional prior art cable harness that is attached to a cable stopper brazed on a bicycle frame.

In the embodiments as shown in FIGS. 1–3, the third diameter or width of the stopper bushing 3a will expand in one way or another as a result of the fastening operation of the hanger fixing bolt 4, so as to attain the desired mounting effect to the bicycle frame 40. Afterwards, a hose or hydraulic line 60 can be inserted into the cable portion 16 of the hose hanger 1a by being pressed through the longitudinal opening 162 so as to be secured to the bicycle frame 40, as shown in FIG. 9.

Figure 4:
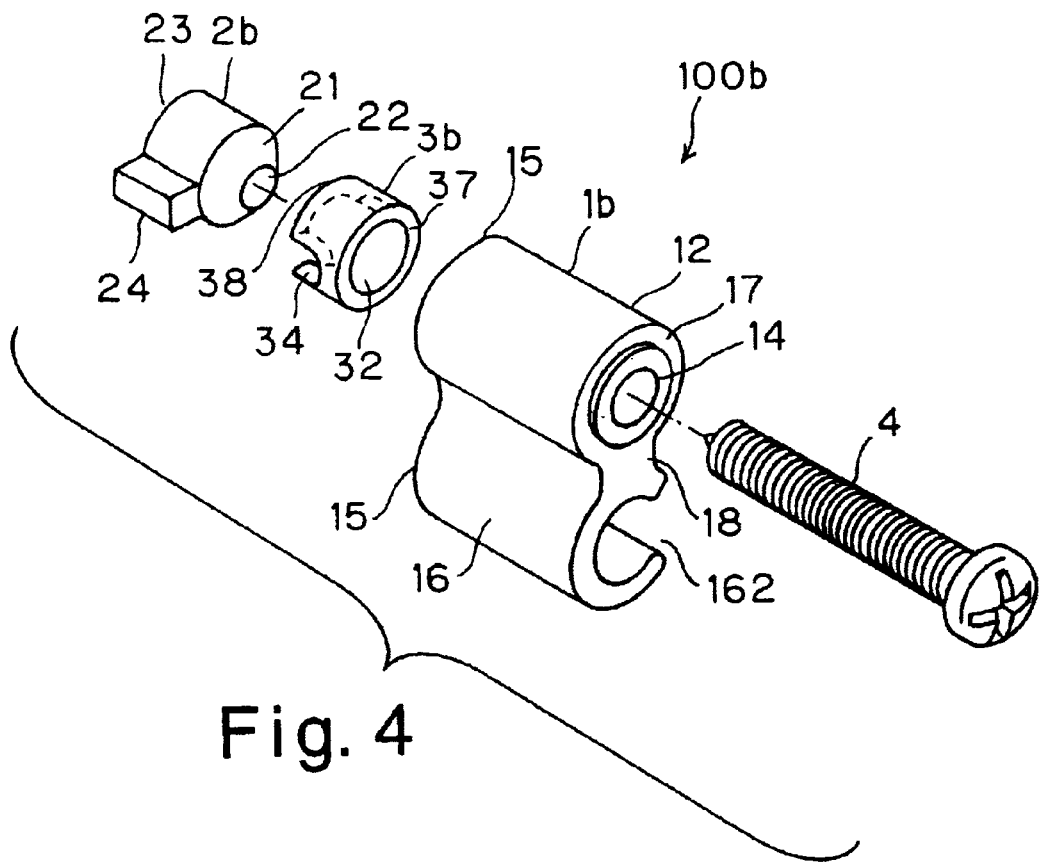
FIG. 4 is an exploded view illustrating a second embodiment of a cable harness assembly of this invention.
Figure 5:
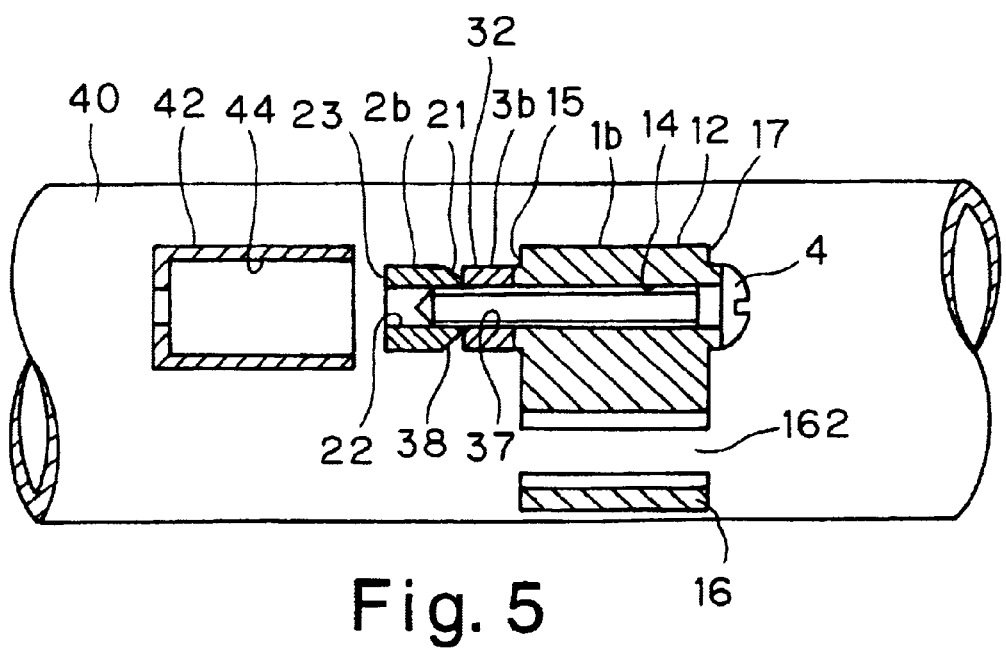
FIG. 5 is a cross-sectional view illustrating the cable harness assembly of FIG. 4 before being mounted to a cable stopper brazed on a bicycle frame.

In a further embodiment shown in FIGS. 4 and 5, the lateral ends 21 of the hanger stopper 2b next to the stopper bushing 3b tapers radially inwards. The radially expandable material for making the stopper bushing 3b is a deformable, rigid material, such as metal or plastic. The stopper bushing 3b is further formed with at least one blind slit 34 along a longitudinal direction thereof. The cooperation between the tapering lateral end 21 and the slits 34 will be described later.

Accordingly, in the embodiment as shown in FIGS. 1–3, the fastening operation will force the hanger stopper 2a to move towards the stopper bushing 3a so as to press against the stopper bushing 3a, such that the third outer diameter or width of the stopper bushing 3a increases due to radial deformation to a point to urge against the inner wall 44 of the cable stopper 42 so as to secure the cable harness 100a to the bicycle frame 40 due to radial expansion of the stopper bushing 3a.

The second embodiment is assembled in substantially the same manner as the first embodiment. The hose hanger 1b, the hanger stopper 2b and the stopper bushing 3b are coupled together by inserting the hanger fixing bolt 4 through the first axial bore 14 of the hose hanger 1b, the third axial bore 32 of the stopper bushing 3b and the second axial bore 22 of the hanger stopper 2b. Prior to mounting of the cable harness assembly 100b to a bicycle frame, a tip end of the hanger fixing bolt 4 is inserted and threaded into the second axial bore 22 of the hanger stopper 2b by a distance sufficient to hold the hose hanger 1b, the stopper bushing 3b and the hanger stopper 2b together, but without providing external forces on the stopper bushing 3b, as shown in FIG. 5.

In use, the cable harness assembly 100b is inserted into a cable stopper 42 that is formed with an inner wall 44 and is conventionally brazed to a bicycle frame 40. The lateral end 15 of the hose hanger 1b next to the stopper bushing 3b then urges against a lateral end of the cable stopper 42. The halting piece 24 extending from the hanger stopper 2b is inserted through a slit (not shown) of the cable stopper 42 to halt the hanger stopper 2b from further rotation driven by the hanger fixing bolt 4. A tool (not shown) is then implemented to drive the hanger fixing bolt 4 such that the fixing bolt 4 is fastened to the second axial bore 22 of the hanger stopper 2b. The second axial bore 22 of the hanger stopper 2b may be formed with threads (not shown) therein so as to facilitate the fastening operation. The fixing bolt 4 may also be fastened to the second axial bore 22 in a self-tapping manner so as to reduce manufacturing cost of the hanger stopper 2b.

In the embodiment as shown in FIGS. 4 and 5, the fastening operation will force the hanger stopper 2b to move towards the stopper bushing 3b subjecting the tapering lateral end 21 of the hanger stopper 2b to tuck into the third axial bore 32 of the stopper bushing 3b and causing the stopper bushing 3b to expand and flare open due to the slits 34 provided on the stopper bushing 3b, so as to secure the cable harness assembly 100b to the bicycle frame 40 due to radial expansion of the stopper bushing 3b at the flared portion.

In the embodiments as shown in FIGS. 4 and 5, the third diameter or width of the stopper bushing 3b will expand in one way or another as a result of the fastening operation of the hanger fixing bolt 4, so as to attain the desired mounting effect to the bicycle frame 40. Afterwards, a hose or hydraulic line 60 can be inserted into the cable portion 16 of the hose hanger 1b by being pressed through the longitudinal opening 162 to be secured to the bicycle frame 40, as shown in FIG. 9.

Figure 6:
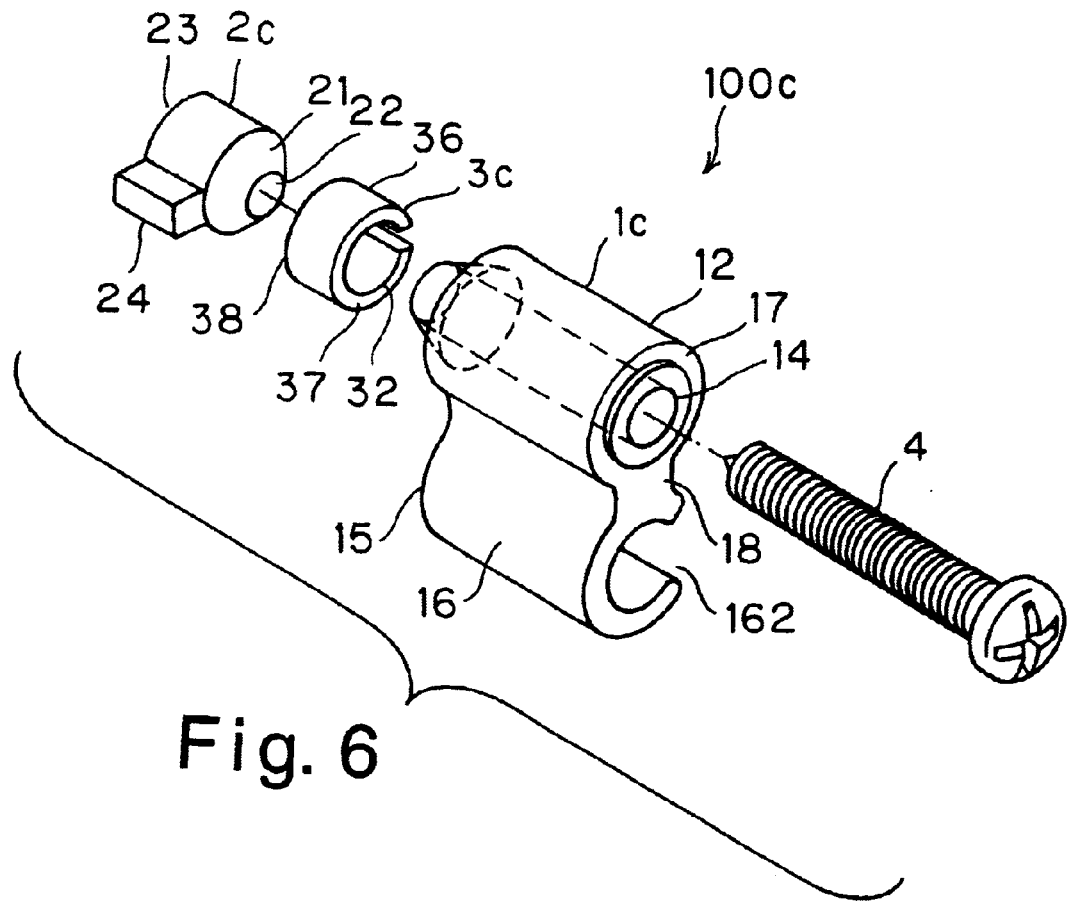
FIG. 6 is an exploded view illustrating a third embodiment of a cable harness assembly of this invention.
Figure 7:
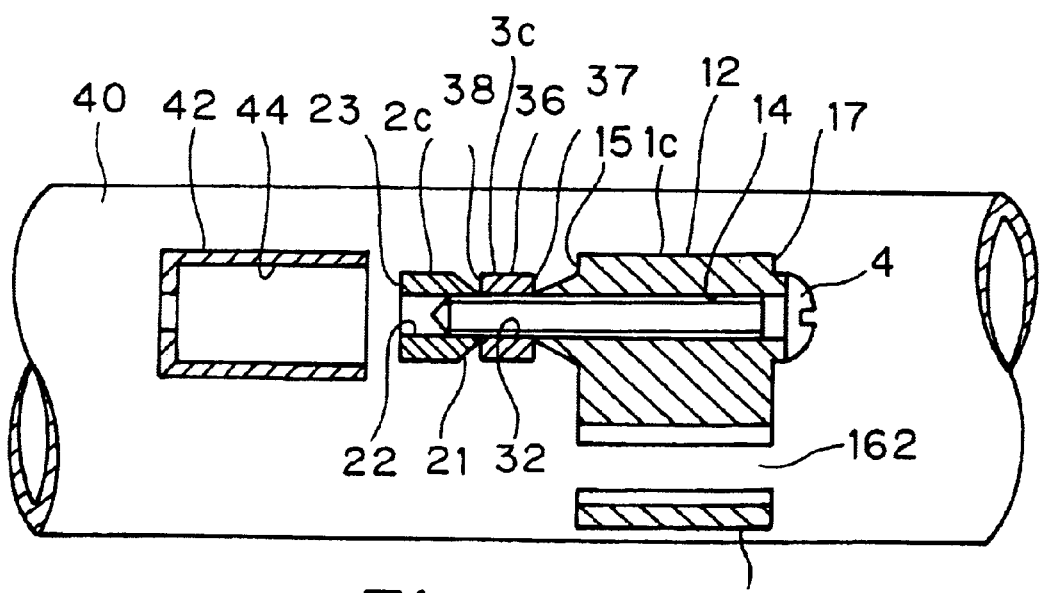
FIG. 7 is a cross-sectional view illustrating the cable harness assembly of FIG. 6 before being mounted to a cable stopper brazed on a bicycle frame.

In still a further embodiment shown in FIGS. 6 and 7, a portion of the lateral end 15 of the hose hanger 1c next to the stopper bushing 3c also tapers radially inwards, preferably from a radial location that is approximate to the second outer diameter or width of the hanger stopper 2c. In this particular embodiment, the stopper bushing 3c is a C-shaped member 36, preferably made of metal or plastic, with a third axial bore 32 as shown. The cooperation between the tapering lateral ends 21, the portion of the lateral end 15 and the C-shaped member 36 will be described later.

The third embodiment is assembled in substantially the same manner as the first embodiment. To assemble the hose hanger 1c, the hanger stopper or and the stopper bushing 3c together, the hanger fixing bolt 4 is inserted through the first axial bore 14 of the hose hanger 1c, the third axial bore 32 of the stopper bushing 3c, and the second axial bore 22 of the hanger stopper 2c. Prior to mounting of the cable harness assembly 100c to a bicycle frame, a tip end of the hanger fixing bolt 4 is inserted and threaded into the second axial bore 22 of the hanger stopper 2c by a short distance sufficient enough to hold the hose hanger 1c, the stopper bushing 3c, and the hanger stopper 2c together, but without providing external forces on the stopper bushing 3c, such as those shown in FIG. 7.

In use, the cable harness assembly 100c is inserted into a cable stopper 42 that is formed with an inner wall 44 and is conventionally brazed to a bicycle frame 40. The lateral end 15 of the hose hanger 1c next to the stopper bushing 3c then urges against a lateral end of the cable stopper 42. The halting piece 24 extending from the hanger stopper 2c is inserted through a slit (not shown) of the cable stopper 42 to halt the hanger stopper 2c from further rotation driven by the hanger fixing bolt 4. A tool (not shown) is then implemented to drive the hanger fixing bolt 4 such that the fixing bolt 4 is fastened to the second axial bore 22 of the hanger stopper 2c. The second axial bore 22 of the hanger stopper 2c may be formed with threads (not shown) therein so as to facilitate the fastening operation. The fixing bolt 4 may also be fastened to the second axial bore 22 in a self-tapping manner so as to reduce manufacturing cost of the hanger stopper 2c.

In the embodiment as shown in FIGS. 6 and 7, the fastening operation will force the hanger stopper 2c to move towards the C-shaped member 36, subjecting the tapering lateral end 21 of the hanger stopper 2c to tuck into the axial bore 32 of the C-shaped member 36 and further causing the expanded C-shaped member 36 to slide towards the tapering lateral end 15 of the hose hanger 1c, to secure the cable harness assembly 100c to the bicycle frame 40 due to expansion of the C-shaped member 36.

In the embodiments as shown in FIGS. 6 and 7, the third diameter or width of the stopper bushing 3c will expand in one way or another as a result of the fastening operation of the hanger fixing bolt 4, so as to attain the desired mounting effect to the bicycle frame 40. Afterwards, a hose or hydraulic line 60 can be inserted into the cable portion 16 of the hose hanger 1c by being pressed through the longitudinal opening 162 to be secured to the bicycle frame 40, as shown in FIG. 9.

Figure 8:
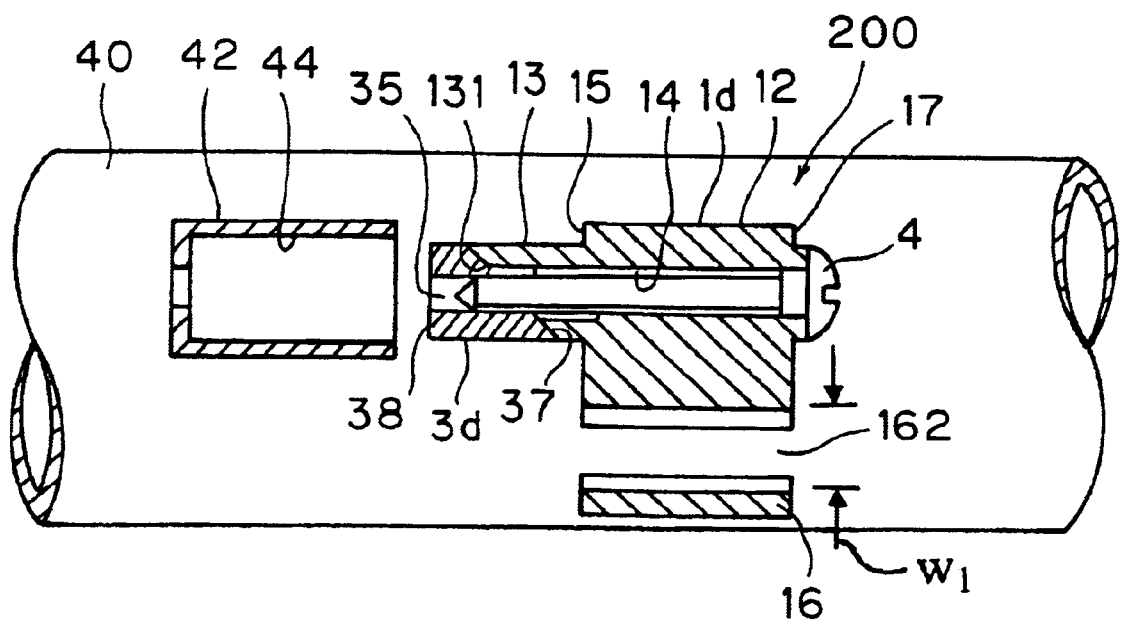
FIG. 8 is a cross-sectional view illustrating a fourth embodiment of a cable harness assembly of this invention, in which a hose hanger has a one-piece structure.
Figure 11:
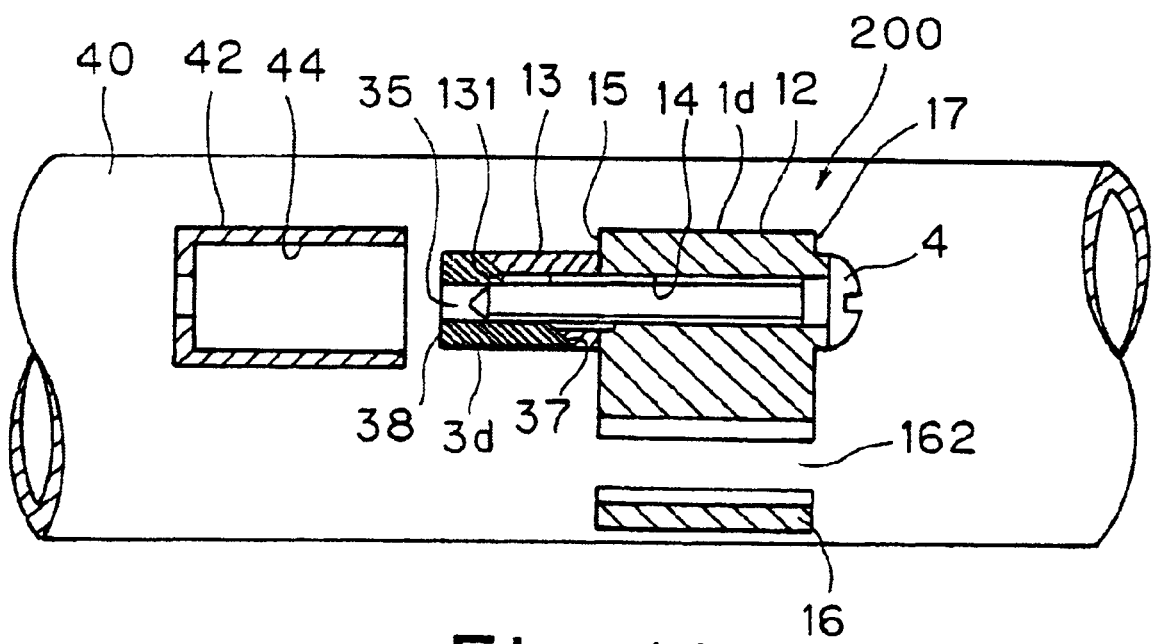
FIG. 11 is a cross-sectional view illustrating a fourth embodiment of a cable harness assembly of this invention, in which a hose hanger has a two-piece structure.

Another embodiment of this invention as shown in FIG. 8, discloses a cable harness assembly 200 comprising a hose hanger 1d, a stopper bushing 3d and a hanger fixing bolt 4. The hose hanger 1d, in this embodiment, includes a body portion 12 of a first outer diameter or width, a cable portion 16 extending from the body portion 12, and opposite ends 15 and 17. The cable portion 16 of the hose hanger 1d has a C-shaped cross-section. The body portion 12 has a first outer diameter or width and is formed with a first axial bore 14 of a first inner diameter or width therethrough. The body portion 12 of this embodiment is provided at one of the lateral ends 15 with a head 13 having a fourth outer diameter or width, preferably being smaller than the first outer diameter or width of the body portion 12, having a lateral end 131. As shown in FIG. 11, the hose hanger 1d, in this embodiment, may be optionally, a two-piece structure, where the head 13 is independent from the body portion 12. Alternatively, as shown in FIG. 8, the hose hanger 1d has a one-piece structure, where the head 13 is integrally formed with the hose hanger 1d. The hose hanger 1d is integrally formed as a one-piece, unitary member by injection molding. In addition, FIG. 8 shows that the head 13 extends from the end 15 such that the end 15 forms an axially facing abutment surface that is at least located substantially radially opposite to the cable portion 16.

The stopper bushing 3d is placed next to the hose hanger 1d and formed with a threaded axial bore 35 of a second inner diameter or width therethrough. The stopper bushing 3d is made of a rigid material, such as metal or plastic, that has a third outer diameter or width being approximate to the fourth outer diameter or width of the head 13 of the hose hanger 1d.

In this embodiment, the lateral end 131 of the head 13 of the hose hanger 1d and the lateral end 37 of the stopper bushing 3d next to each other are both skewed, such that the fastening operation as described previously, will force the stopper bushing 3d to rotate and skew with respect to the head 13 of the hose hanger 1d due the skewed interface therebetween, to a point that interfacing tip of the head 13 urges against the inner wall 44 of the cable stopper 42 so as to secure the cable harness 200 to the bicycle frame 40. The first inner diameter or width of the first axial bore 14 of the hose hanger 1d may be, optionally, slightly bigger than the second inner diameter or width of the threaded axial bore 35 of the stopper bushing 3d, to facilitate the skewing of the stopper bushing 3d when the fixing bolt 4 is fastened to the threaded axial bore 35 of the stopper bushing 3d.

In this embodiment, the disposition between the stopper bushing 3d and the hose hanger 1d changes as a result of the fastening operation of the hanger fixing bolt 4, to attain the desired mounting effect to the bicycle frame 40.

Apparently, the various embodiments of cable harness assembly 100a, 100b, 100c and 200 as described can be easily mounted to a conventional cable stopper 42 without the necessity to dismantle the cable harness assembly 100a, 100b, 100c and 200 or involve extraneous work.

While only selected embodiments have been chosen to illustrate the invention, it will be apparent to those skilled in the art from this disclosure that various changes and modifications can be made without departing from the scope of the invention as defined in the appended claims. Also, the foregoing description of the embodiments according to the invention are provided for illustration only, and not for the purpose of limiting the invention as defined by the appended claims and their equivalents.

What is claimed is:

1. A cable harness assembly comprising:

a hose hanger including a body portion and a cable portion extending from the body portion, said hose hanger further including a neck portion joining said body portion and said cable portion for enhancing flexibility of said hose hanger, said cable portion being formed with a longitudinal slot having a central longitudinal axis, said body portion including a first axial bore having a first inner width extending between opposite ends, said first axial bore extending along a first longitudinal axis that is substantially parallel to said central longitudinal axis, said body portion being provided at one of said opposite ends with a head having a skewed end, said head extending from said one of said opposite ends such that said one of said opposite ends forms an axially facing abutment surface that is at least located substantially radially opposite said cable portion;

a stopper bushing including a threaded axial bore having a second inner width extending between opposite ends of said stopper bushing, said stopper bushing being located adjacent said hose hanger with one of said opposite ends of said stopper bushing being skewed and located adjacent said skewed end of said head of said hose hanger; and a hanger fixing bolt extending through said first axial bore of said hose hanger and into said threaded axial bore of said stopper bushing to couple said hose hanger and said stopper bushing together, said stopper bushing being rotated and further skewed with respect to said head of said hose hanger when said hanger fixing bolt is threaded into said threaded axial bore of said stopper bushing.

2. The cable harness assembly according to claim 1, wherein said first inner width of said first axial bore of said hose hanger is slightly bigger than said second inner width of said threaded axial bore of said stopper bushing.

3. The cable harness assembly according to claim 1, wherein said cable portion has a C-shaped cross-section.

4. The cable harness assembly according to claim 1, wherein said hose hanger is integrally formed as a one-piece, unitary member by injection molding.

5. The cable harness assembly according to claim 1, wherein said stopper bushing is made of a rigid material.

6. The cable harness assembly according to claim 5, wherein said rigid material is plastic.

7. The cable harness assembly according to claim 5, wherein said rigid material is metal.

8. The cable harness assembly according to claim 1, wherein said hose hanger is a two-piece structure, with said head being independent from said body portion.

9. The cable harness assembly according to claim 1, wherein said hose hanger is a one-piece structure with said head being integrally formed with said hose hanger.

10. A cable harness assembly comprising:

a hose hanger including a body portion and a cable portion extending from the body portion, said hose hanger further including a neck portion joining said body portion and said cable portion for enhancing flexibility of said hose hanger, said body portion including a first axial bore having a first inner width extending along a first longitudinal axis between opposite ends, said cable portion including a longitudinal slot extending along a second central longitudinal axis and said second central longitudinal axis being substantially parallel to said first longitudinal axis, said body portion being provided at one of said opposite ends with a head having a skewed end;

a stopper bushing including a threaded axial bore having a second inner width extending between opposite ends of said stopper bushing, said stopper bushing being located adjacent said hose hanger with one of said opposite ends of said stopper bushing being skewed and located adjacent said skewed end of said head of said hose hanger; and a hanger fixing bolt extending through said first axial bore of said hose hanger and into said threaded axial bore of said stopper bushing to couple said hose hanger and said stopper bushing together, said stopper bushing being rotated and further skewed with respect to said head of said hose hanger when said hanger fixing bolt is threaded into said threaded axial bore of said stopper bushing.

11. The cable harness assembly according to claim 10, wherein said first inner width of said first axial bore of said hose hanger is slightly bigger than said second inner width of said threaded axial bore of said stopper bushing.

12. The cable harness assembly according to claim 10, wherein said cable portion has a C-shaped cross-section.

13. The cable harness assembly according to claim 10, wherein said hose hanger is integrally formed as a one-piece, unitary member by injection molding.

14. The cable harness assembly according to claim 10, wherein said stopper bushing is made of a rigid material.

15. The cable harness assembly according to claim 14, wherein said rigid material is plastic.

16. The cable harness assembly according to claim 14, wherein said rigid material is metal.

17. The cable harness assembly according to claim 10, wherein said hose hanger is a two-piece structure, with said head being independent from said body portion.

18. The cable harness assembly according to claim 10, wherein said hose hanger is a one-piece structure with said head being integrally formed with said hose hanger.

* * * * *

UNITED STATES PATENT AND TRADEMARK OFFICE
CERTIFICATE OF CORRECTION

PATENT NO. : 6,685,384 B2  Page 1 of 1
DATED : February 3, 2004
INVENTOR(S) : Yuzuru Uchiyama It is certified that error appears in the above-identified patent and that said Letters Patent is hereby corrected as shown below:

Title page,
Item [60], Related U.S. Application Data, insert
-- [30] Foreign Application Priority Data
  Jan. 14, 2000 (TW)……………………...089100612 --

Signed and Sealed this

Eleventh Day of January, 2005

JON W. DUDAS
*Director of the United States Patent and Trademark Office*